United States Patent
Sasaki et al.

(10) Patent No.: US 7,190,107 B2
(45) Date of Patent: Mar. 13, 2007

(54) DISPLAY DEVICES PROVIDED WITH AN ARRANGEMENT OF ELECTRON SOURCES AND CONTROL ELECTRODES

(75) Inventors: Susumu Sasaki, Chiba (JP); Yoshiyuki Kaneko, Hachioji (JP); Toshifumi Ozaki, Mobara (JP); Shigemi Hirasawa, Chiba (JP); Yuuichi Kijima, Chosei (JP); Tomoki Nakamura, Chiba (JP)

(73) Assignee: Hitachi Displays, Ltd., Mobara (JP)

( * ) Notice: Subject to any disclaimer, the term of this patent is extended or adjusted under 35 U.S.C. 154(b) by 232 days.

(21) Appl. No.: 10/660,720

(22) Filed: Sep. 12, 2003

(65) Prior Publication Data

US 2004/0056586 A1    Mar. 25, 2004

(30) Foreign Application Priority Data

Sep. 20, 2002  (JP)  ............................. 2002-274316

(51) Int. Cl.
*H01J 1/304* (2006.01)
*H01J 1/30* (2006.01)
*H01J 1/48* (2006.01)
*H01J 1/00* (2006.01)

(52) U.S. Cl. .................. 313/311; 313/310; 313/309

(58) Field of Classification Search ........ 313/495–497, 313/309–311
See application file for complete search history.

(56) References Cited

U.S. PATENT DOCUMENTS

| | | | |
|---|---|---|---|
| 3,453,478 A | 7/1969 | Shoulders et al. | |
| 4,096,406 A * | 6/1978 | Miram et al. | 313/348 |
| 6,208,072 B1 | 3/2001 | Watanabe et al. | |
| 6,400,091 B1 * | 6/2002 | Deguchi et al. | 313/495 |
| 6,815,875 B2 * | 11/2004 | Kuo et al. | 313/309 |
| 6,958,571 B2 * | 10/2005 | Nishibayashi et al. | 313/309 |
| 2002/0117953 A1 * | 8/2002 | Kuo et al. | 313/310 |

FOREIGN PATENT DOCUMENTS

| | | |
|---|---|---|
| JP | 11-144652 | 5/1999 |
| JP | 2000-21305 | 1/2000 |
| JP | 2000-323078 | 11/2000 |
| JP | 2000348599 A * | 12/2000 |
| JP | 2002100281 A * | 4/2002 |
| JP | 2002289089 A * | 10/2002 |
| JP | 2003249161 A * | 9/2003 |

* cited by examiner

*Primary Examiner*—Mariceli Santiago
(74) *Attorney, Agent, or Firm*—Antonelli, Terry, Stout and Kraus, LLP.

(57) ABSTRACT

A field emission type display device has a structure in which each pixel is constituted of a combination of a plurality of small apertures and a plurality of small electron sources. Due to such a constitution, it is possible to reduce undesired impact of electrons on control electrodes and the enhancement of the heat resistance of the carbon nanotubes of electron sources, whereby it is possible to obtain a display device of high quality and long lifetime, while exhibiting a high-performance electron emission characteristic. Boron (B) is adhered to carbon nanotubes, which constitute electron sources, through the small apertures of the control electrodes; and, hence, the alignment of the small apertures and the small electron sources is ensured and the area of the electron source is set to be equal to or less than the area of the aperture.

2 Claims, 10 Drawing Sheets

DISPLAY DEVICES PROVIDED WITH AN ARRANGEMENT OF ELECTRON SOURCES AND CONTROL ELECTRODES

BACKGROUND OF THE INVENTION

The present invention relates to a display device, which utilizes an emission of electrons into a space which is in a vacuum state; and a method of fabrication thereof; and, more particularly, the invention relates to a display device having a high performance and a high reliability, in which the position and the size of electron sources can be established with precision, and, at the same time, deterioration of the characteristics of the electron sources can be prevented.

As a display device which exhibits high brightness and the high definition, color cathode ray tubes have been widely used conventionally. However, along with the recent desire for information processing equipment or television broadcasting that is capable of providing images of higher quality, the demand for planar displays (panel displays) which are light in weight and require a small space, while also exhibiting a high brightness and a high definition, has been increasing. As typical examples of such panel display devices, liquid crystal display devices, plasma display devices and the like have been developed. More particularly, as display devices which provide a higher brightness, it is expected that various other kinds of panel-type display devices, including a display device which utilizes an emission of electrons from electron sources into a vacuum (hereinafter referred to as "an electron emission type display device" or "a field emission type display device") and an organic EL display device, which is characterized by low power consumption, will be put into practice.

Among panel type display devices, such as the above-mentioned field emission type display device, a display device having an electron emission structure which was developed by C. A. Spindt et al (for example, see U.S. Pat. No. 3,453,478), a display device having an electron emission structure of a metal-insulator-metal (MIM) type, a display device having an electron emission structure which utilizes an electron emission phenomenon based on a quantum theory tunneling effect (also referred to as a "surface conduction type electron source", see Japanese Unexamined Patent Publication 2000-21305, for example), and a display device which utilizes an electron emission phenomenon having a diamond film, a graphite film and carbon nanotubes and the like have been known.

FIG. 11 is a cross-sectional view showing one example of a known field emission type display device. FIG. 12(a) and FIG. 12(b) are diagrams showing an example of an electron source of one pixel and a control electrode which controls the electron emission quantity of the electron source in the field emission type display device shown in FIG. 11. The field emission type display device is constituted such that, between inner peripheries of both of a back panel 100, having field emission type electron sources and control electrodes formed on an inner surface thereof, and a face panel 200, having anodes and fluorescent material layers formed on an inner surface thereof which faces the back panel 100 in an opposed manner, a sealing frame 300 is inserted and sealed so as to create an inner space which is defined by the back panel 100, the face panel 200 and the sealing frame 300. The pressure of this inner space is set to a value lower than the external pressure, or a vacuum is created in the inner space (with conditions hereinafter will be referred to simply as a "vacuum" state).

The back panel 100 includes a plurality of cathode lines 2, having electron sources disposed thereon, and control electrodes 4, which are configured to cross the cathode lines 2 and to be separated therefrom by way of insulating layers 3; and, these elements are supported on one surface of a back substrate 1, which is preferably made of glass or ceramics. In response to a potential difference applied between the cathode line 2 and the control electrode 4, the emission quantity (including turning on and off of emission) of electrons that are emitted from the electron source is controlled. Further, the face panel 200 includes anodes 7 and fluorescent materials 6 supported on one surface of a face substrate 5 that is made of a light transmissive material, such as glass. The sealing frame 300 is fixed to the inner peripheries of the back panel 100 and the face panel 200 using an adhesive material, such as frit glass. The inside space that is formed by the back panel 100, the face panel 200 and the sealing frame 300 is evacuated at a degree of vacuum of $10^{-5}$ to $10^{-7}$ Torr, for example. The gap between the back panel 100 and the face panel 200 is held by gap holding members 9.

The insulating layers 3 are interposed between the cathode lines 2, which are formed on the back substrate 1 of the back panel 100, and the control electrodes 4, which cross the cathode lines 2 and apertures (grid holes) 4a, are formed in respective crossing portions or regions of the control electrodes 4. On the other hand, the electron sources 2a are formed on the above-mentioned crossing portions in corresponding regions of the cathode lines 2, while the insulating layer 3 is removed at portions of the cathode lines 2 which correspond to the apertures 4a formed in the control electrodes 4. The apertures 4a allow the electrons emitted from the electron sources 2a to pass therethrough to the anode side.

The above-mentioned electron sources are constituted, for example, of carbon nanotubes (CNT), diamond-like carbons (DLC) or other field emission cathodes. Here, as the electron sources, sources which use carbon nanotubes (hereinafter referred to as a "CNT") are employed. As shown in FIG. 12(a) and FIG. 12(b), the electron source 2a is arranged right below the aperture 4a of the control electrode 4. Although one electron source 2a is allocated to each one pixel in FIG. 12(a) and FIG. 12(b), it is also possible to allocate a plurality of electron sources 2a to one pixel.

FIG. 13(a) and FIG. 13(b) are diagrammatic views of a display device in which a plurality of electron sources are formed per one pixel. That is, FIG. 13(a) and FIG. 13(b) show an arrangement in which a plurality of small electron sources and small apertures are formed per one pixel. Here, a plurality of small apertures 4a1 to 4aN are formed in the control electrode 4 and a plurality of small electron sources 2a1 to 2aN are formed on the cathode line 2 at positions corresponding to the respective small apertures. The electrons irradiated from the back panel 100 impinge on the fluorescent material 6 that is formed on the face panel 200, which faces the back panel 100 in an opposed manner. Then, light which responds to the light emitting property of the fluorescent material 6 is irradiated to the outside of the face panel 200 so that the structure functions as a display device.

FIG. 14 is a diagrammatic cross-sectional view showing another example of a known field emission type display device which includes one electron source and one aperture per one pixel. Further, FIG. 15 is an enlarged cross-sectional view of the portion indicated by A in FIG. 14. In FIG. 14 and FIG. 15, reference symbol 100 indicates a back panel, reference symbol 200 indicates a face panel and reference symbol 300 indicates a sealing frame. The back panel 100 includes cathode lines 2, which have electron sources 2a disposed thereon, and control electrodes 4, which are provided in an insulated manner from the cathode lines 2 or an inner surface of the back substrate 1. In this example, the control electrodes 4 are held in such a way that the above-mentioned insulating layer 3 is not interposed therebetween. Further, on an inner surface of the face substrate 5, which constitutes the face panel 200, fluorescent materials 6 and anodes 7 are formed in the same manner as provided in the previously-mentioned display devices.

The control electrode 4 has the function of controlling the emission of electrons (pulling out of electrons) from the electron source 2a, which is arranged on the cathode line 2. Further, in place of the control electrode 4, or in addition to the control electrode 4, it may be possible to adopt a constitution in which another electrode is provided for applying a potential which converges electrons to the fluorescent material 6. Although the fluorescent material 6 is formed on the anodes 7 in FIG. 14, it is also possible to arrange the anode 7 so that it covers the fluorescent material 6. Further, it is also possible to provide a light shielding layer (black matrix) between the neighboring fluorescent materials 6. The back panel 100 and the face panel 200 are laminated to each other by a sealing frame 300 and the space defined between them is sealed in a vacuum.

As shown in FIG. 15, electron sources 2a are formed on the cathode lines 2 that are provided on the back panel 100. The electron source 2a is formed of an electron emitting material which efficiently generates electrons in response to an electric field applied between the cathode line 2 and the control electrode 4. With respect to a conductive material, in general, the sharper the shape of outside edges thereof which are exposed to the electric field, the higher will be the electron emitting performance exhibited by the conductive material. Accordingly, by adopting a fiber-like (rod-like) conductive material, it is possible to realize a highly efficient electron emission. As one example of such electron emitting materials, the above-mentioned CNT exists.

When a fiber-like conductive material is used as the material of the electron sources 2a, it is necessary to fix the conductive fibers on the cathode lines 2. Here, an explanation of how this is done will be made with respect to a case in which a CNT is used as the fiber-like conductive material. A CNT is an extremely fine needle-like carbon compound. In a strict sense, it is a hollow substance in which a planar structure called graphene, which is formed of carbon atoms arranged in a hexagonal shape, is arranged in a cylindrical shape and is closed and has a diameter on a nanometer scale. By arranging a CNT on the cathode line so as to use the CNT as an electron source, it is possible to obtain an efficient electron emission. In arranging the CNT on the cathode line, there is a known a method in which an electrode paste, which is formed by mixing the CNT together with a conductive filler, such as silver or nickel, is applied to the cathode line to form an electron source layer, and, thereafter, the electron source layer is baked so as to be fixed to the cathode line. Here, the following publications represent example which disclose the related art on this type of display device: Japanese Unexamined Patent Publication 11-144652, and Japanese Unexamined Patent Publication 2000-323078.

SUMMARY OF THE INVENTION

In the above-mentioned conventional field emission type display device, electrons emitted from the electron sources 2a pass through the apertures 4a and impinge on the fluorescent material 6 of the anodes 7 and excite the fluorescent material 6 so as to emit light and produce a display. Accordingly, the field emission type display device provides an excellent design which possesses excellent characteristics, such as the ability to produce a display of high brightness and high definition, and it constitutes a planar display device which is light-weight and requires a small space for installation. However, in spite of such excellent characteristics, the display device still has drawbacks to be solved. That is, some of the electrons emitted from the electron source 2a tend to flow into the control electrode 4, which causes the display efficiency to be lowered. Further, when the control electrode 4 is made of a metallic material, it is necessary to address the problem of heat dissipation, besides the lowering of the display efficiency.

More particularly, it is difficult to ensure proper alignment of the electron source 2a and the aperture 4a corresponding to the electron source 2a, and this eventually leads to the above-mentioned lowering of the display efficiency. Further, a CNT is deteriorated and dissipated due to heating during the fabrication steps; and, hence, a sufficient electron emission quantity cannot be obtained, and the formation of an electron source that is capable of uniformly emitting electrons is difficult. Thus, this type of display device has not been put into practice as a result of these drawbacks, which constitute problems to be solved.

Accordingly, it is an object of the present invention to provide a display device in which the above-mentioned drawbacks can be solved, a high-performance in electron emission can be exhibited and deterioration of the characteristics of the electron sources can be prevented, whereby high reliability and a long lifetime of use can be achieved.

To achieve the above-mentioned object, the display device according to the present invention is characterized by a constitution in which a plurality of small electron sources and small apertures are provided to each pixel, and the small electron sources include boron (B). The display device of the present invention also is characterized by the acquisition of alignment of the small electron sources with the small apertures corresponding to the small electron sources, by the acquisition of a relative relationship between areas of the small electron sources and areas of the small apertures corresponding to the small electron sources, and by the suppression of the dissipation of the CNT caused by heating during the fabricating steps. Examples of the basic constitution of the present invention are as follows.

(1) The display device according to the present invention is provided with a back panel which includes a plurality of cathode lines, a plurality of electron sources which are arranged on the plurality of cathode lines, control electrodes which are arranged to face the cathode lines in an opposed manner and control an emission quantity of electrons from the electron sources, and a back substrate which holds the cathode lines, and a face panel which includes anodes and fluorescent materials. The control electrodes include a plurality of small apertures which allow electrons emitted from the electron sources to pass therethrough to the face panel side at respective regions which face each electron source, and each respective electron source is divided into a plurality of small electron sources corresponding to the plurality of respective small apertures provided in each region, and boron (B) is contained in the small electron sources. Boron (B) is arranged on control-electrode-side surfaces of the small electron sources or on cathode-line-side surfaces of the small electron sources. Alternatively, boron (B) may be arranged on surfaces of the cathode lines with respect to a plurality of small electron sources in common.

In this manner, by arranging the small electron sources containing boron corresponding to the small apertures formed in the control electrode, the inflow of the electrons to the control electrode can be reduced, whereby it is possible to obtain a display device which has an excellent electron emission characteristic and in which deterioration of property of electron sources can be presented. Hence, the display device can exhibit high definition, high performance and high reliability. Here, the area of the small electron source is set to be smaller than the area of the small aperture which corresponds to the small electron source.

Due to such a constitution, the electrons which are radiated from the small electron sources pass through the small apertures in the anode direction without wasting electrons; and, hence, it is possible to obtain images of high brightness with low power and, at the same time, the problem of heat dissipation of the control electrode can be solved.

(2) The display device according to the present invention is provided with a back panel which includes a plurality of cathode lines, a plurality of electron sources which are arranged on the plurality of cathode lines, control electrodes which are arranged to face the cathode lines in an opposed manner and control an emission quantity of electrons from the electron sources, and a back substrate which holds the cathode lines, and a face panel which includes anodes and fluorescent materials. The control electrodes include a plurality of small apertures which allow electrons emitted from the electron sources to pass therethrough to the face panel side at respective regions thereof which face the each electron source, and each respective electron source is divided into a plurality of small electron sources corresponding to the plurality of respective small apertures provided in each region, and boron (B) is contained in the small electron sources and the control electrodes. The control electrodes are made of a metal material.

Due to such a constitution, the surfaces of the control electrodes are covered with boron (B); and, hence, an undesired emission (grid emission) of electrons from the surfaces of the control electrodes can be suppressed, and, at the same time, the problem of heat dissipation of the control electrodes can be solved.

(3) Further, the display device according to the present invention is provided with a back panel which includes a plurality of cathode lines, a plurality of electron sources which are arranged on the plurality of cathode lines, control electrodes which are arranged to face the cathode lines in an opposed manner and control an emission quantity of electrons from the electron sources, and a back substrate which holds the cathode lines, and a face panel which includes anodes and fluorescent materials. The control electrodes include a plurality of small apertures which allow electrons emitted from the electron sources to pass therethrough to the face panel side at respective regions which face each electron source, and projecting portions which extend to the back substrate side at portions which differ from portions which face the cathode lines. Each electron source is divided into a plurality of small electron sources corresponding to the plurality of respective small apertures provided in each region, and designating a distance between top surfaces of the small electron sources and bottom surfaces of the small apertures as "a" and a distance between inner surfaces of projecting portions and a side face of the small electron source closest to the inner surfaces of projecting portions as "b", a relationship $b \geq 2a$ is established. One ends of the projecting portions is brought into contact with the back substrate.

Due to such a constitution, the dielectric strength property can be enhanced and the display efficiency is enhanced by suppressing the inflow of electrons into the control electrodes, so that the control electrodes can be supported in a more stable manner by being supported by the projecting portions.

(4) The fabrication of the above-mentioned display device according to the present invention includes a step of forming a plurality of cathode lines on a back substrate, a step of forming a plurality of electron sources to each cathode line, a step of adhering boron (B) to respective electron sources by way of masks, each of which has a plurality of small openings corresponding to each electron source, and a step of forming portions of each electron source which correspond to the small openings and to which the boron (B) is adhered into small electron sources by heating each electron source.

The control electrodes can be used as the masks and the electron sources heated at a temperature of equal to or more than 450° C. By preventing the dissipation of the fiber-like conductive material, such as CNT, which constitutes the electron source, it is possible to obtain a sufficient electron emission quantity. Further, it is possible to constitute the electron source which emits the electrons uniformly, and, at the same time, it is possible to obtain a display device which hardly suffers from deterioration of the electron emission characteristic and, hence, enjoys the long lifetime. Further, the alignment between the small electron sources and the small apertures is ensured, and, hence, the display efficiency can be enhanced.

With the use of this method, the heating operation is facilitated; and, hence, by preventing the dissipation of the fiber-like conductive material, such as CNT, which constitutes the electron source, it is possible to obtain a sufficient electron emission quantity. Further, it is possible to constitute the electron source which emits the electrons uniformly, and, at the same time, it is possible to obtain the display device which hardly suffers from deterioration of the electron emission characteristic and, hence, enjoys a long lifetime.

It is needless to say that the present invention is not limited to the above-mentioned constitutions and the constitutions of embodiments to be described later, and various modifications are conceivable without departing from the technical concept of the present invention.

DESCRIPTION OF THE PREFERRED EMBODIMENTS

Figure 1:
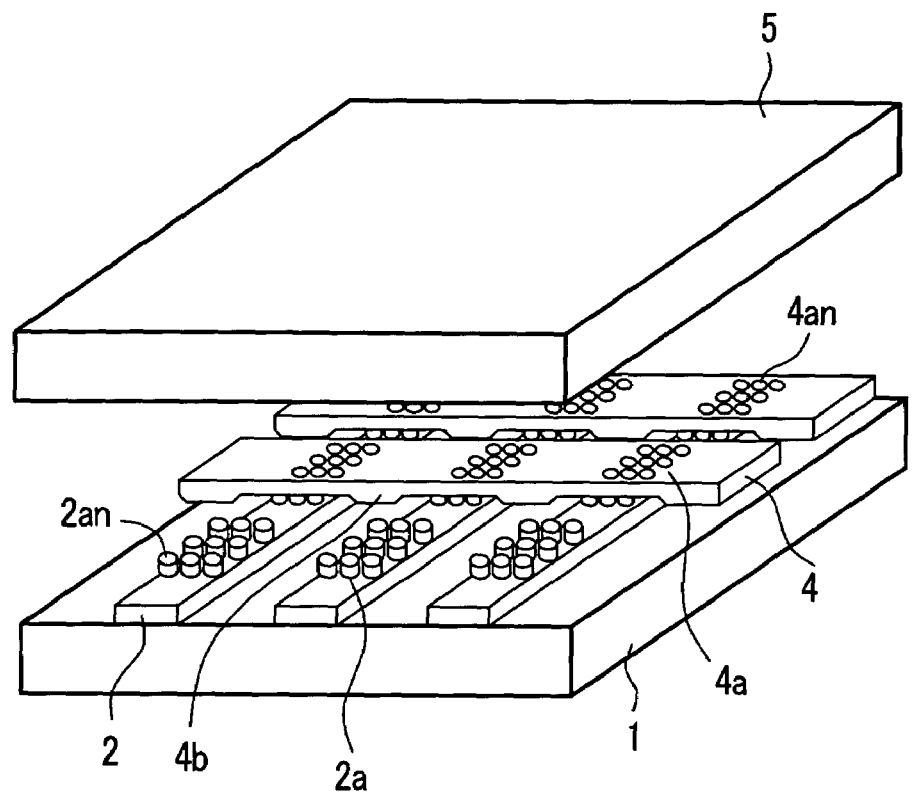
FIG. 1 is a developed perspective view of part of one embodiment of a field emission type display device according to the present invention.

Preferred embodiments of the present invention will be explained in detail hereinafter in conjunction with the drawings which show these embodiments. FIG. 1 is a developed perspective view showing one example of a field emission type display device according to the present invention, wherein parts which are identical with the parts shown in the previously-mentioned drawings and parts which have identical functions are identified by the same symbols. In FIG. 1, the field emission type display device includes an electron-source-side back substrate 1 on which there are cathode lines 2 which hold electron sources 2*a*. The electron sources 2*a* are arranged on a surface of each cathode line 2 at a plurality of positions spaced apart from each other with a given interval, and each electron source 2*a* is constituted of a plurality of small electron sources 2*an*. The plurality of small electron sources 2*an* are formed on a surface of the cathode line 2, which is formed by preliminarily by printing and baking a silver paste in a state in which the small electron sources 2*an* contain silver (Ag), CNT and boron (B), while the electron source 2*a* contains boron (B).

The small electron sources 2*an* are formed by a method in which the small electron sources 2*an* are formed by baking an Ag—B-CNT paste, for example, or by a method which separately adheres boron (B) or the like. Further, the reference symbol 4 indicates control electrodes (metal grids) formed of a metal plate. A plurality of control electrodes 4 are arranged in a spaced-apart manner at a given interval in a direction orthogonal to that of the cathode lines 2. A plurality of apertures 4*a* are formed in and arranged on each control electrode 4 at positions corresponding to the respective electron sources 2*a*. Each aperture 4*a* is constituted of a mass of small apertures 4*an* provided in a number which corresponds to the number of the above-mentioned plurality of small electron sources 2*an*. Each small aperture 4*an* has an area which is substantially equal to the area of each small electron source 2*an* corresponding and they are substantially aligned with each other. Further, a face-panel-5-side surface of each control electrode 4 is covered with a layer containing boron (B) (not shown in the drawing).

Further, each control electrode 4 is provided with projecting portions 4*b*, and these projecting portions 4*b* are positioned at a substantially at the center between the apertures 4*a* and they project toward the back substrate 1 side. The distal ends of the projecting portions 4*b* are adhered to the back substrate 1 between cathode lines 2 by way of an adhesive agent, such as glass frit or the like (not shown in the drawing). The distance between the small apertures 4*an* and the small electron sources 2*an* is defined by the projecting portions 4*b* and is set to approximately 25 µm in this embodiment. Further, although the control electrodes 4 may preferably be made of an iron alloy (for example, 42% Ni-6% Cr-balance Fe), the material of the control electrodes 4 is not limited to such a material.

It is preferable to form the small apertures 4*an* by etching from the viewpoint of accuracy. Further, it is also possible to form the projecting portions 4*b* by etching. Still further, it is also possible to simultaneously form the small apertures 4*an* and the projecting portions 4*b* from both surfaces by etching. In the embodiment shown in FIG. 1, one pixel is constituted of a plurality of small electron sources 2*an* and a plurality of small apertures 4*an* corresponding in number to the plurality of small electron sources 2*an*. Further, in the constitution shown in FIG. 1, as opposed to conventional control electrodes which are formed by sputtering, the control electrodes 4 are formed by machining plate materials; and, hence, an advantageous effect arises in that the control electrodes 4 can be fabricated as separate members. Still further, since the face-substrate-5-side surface of the control electrode 4 is covered with a layer containing boron (B) (not shown in the drawing), the control electrode 4 has a discharge preventing effect.

Figure 2:
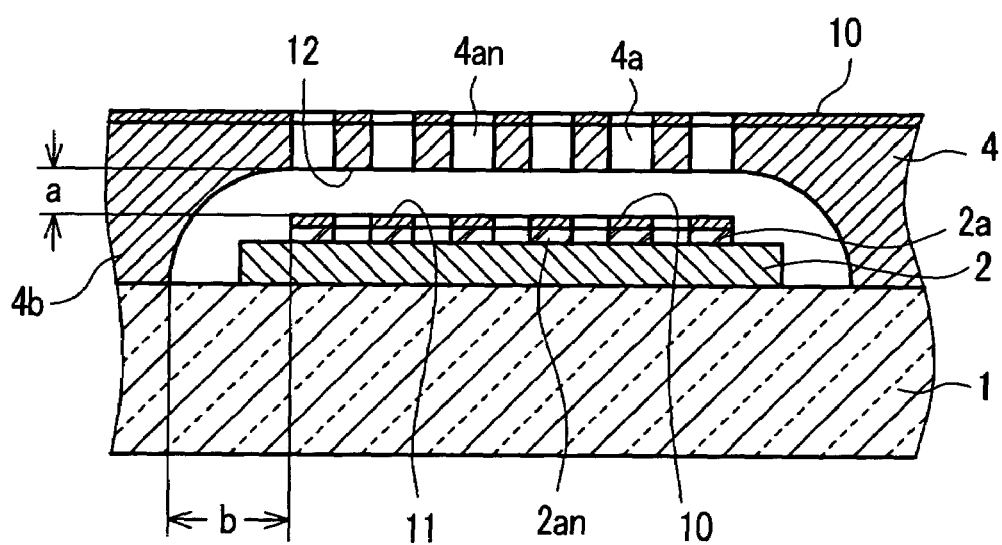
FIG. 2 is an enlarged schematic cross-sectional view of the part shown in FIG. 1.

FIG. 2 is a diagrammatic cross-sectional view showing in enlarged form a representative part of the display device according to the present invention, as shown in FIG. 1. Parts in the drawing which are identical to the parts shown in FIG. 1 are identified by the same symbols. In FIG. 2, the respective small electron sources 2*an* are independently arranged on the cathode line 2 at portions corresponding to the small apertures 4*an* in the overlying control electrode 4. Surfaces of the small electron sources 2*an* and the face-panel-5-side surface of the control electrodes 4 are covered with a layer 10 containing boron (B). The distance "a" between top faces 11 of the small electron sources 2*an* and the bottom surfaces 12 of the small apertures 4*an* is defined by the projecting portions 4*b* of the control electrode 4. As described above, in this embodiment, the distance is set to approximately 25 µm. Further, the distance "b" between the projecting portion 4*b* and the small electron source 2*a* closest to the projecting portion 4*b* is set to a size which maintains the relationship in which the distance "b" is twice or more larger than the distance "a", that is, b≧2a.

By maintaining the above-described relationship between the distance "a" and the distance "b", it is possible to make it difficult for an undesired current to flow in the control electrode 4, and, hence, the display efficiency is enhanced. Further, in this embodiment, the area of the top face 11 of the small electron source 2an is set to be equal to or smaller than the opening area of the corresponding small aperture 4an; and, hence, the inflow of electrons into the control electrode is reduced due to the relative relationship between these areas.

Figure 3:
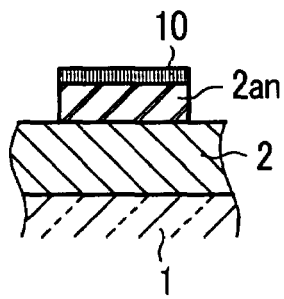
FIG. 3(a) to FIG. 3(g) are enlarged cross-sectional views of examples of an electron source for use in the embodiment of the field emission type display device according to the present invention.
Figure 3:
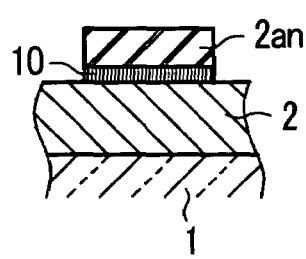
Figure 3:
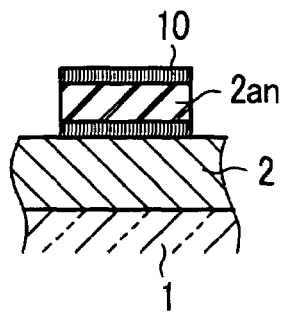
Figure 3:
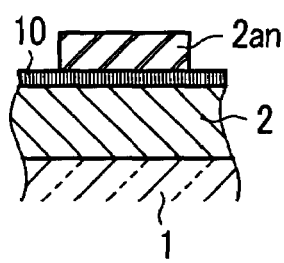
Figure 3:
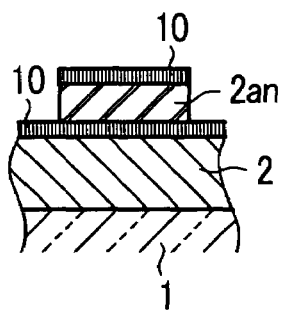
Figure 3:
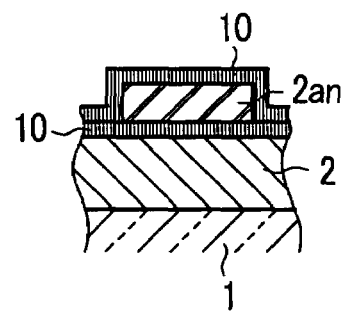
Figure 3:
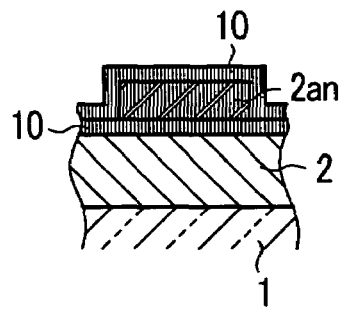

FIG. 3(a) to FIG. 3(g) are enlarged cross-sectional views showing examples of small electron sources 2an for use in the embodiment of the display device according to the present invention. FIG. 3(a) shows an example of the small electron source shown in FIG. 2, and FIG. 3(b) shows an example of the small electron source 2an in which the layer 10 containing boron (B) is formed on the cathode-line-2-side thereof. The example pf FIG. 3(b) is characterized by preliminarily forming the layer 10, having substantially the same area as the small electron source 2an and containing boron (B), at a position on the surface of the cathode line 2 where the small electron source 2an is to be formed and overlapping the small electron source 2a on the layer 10 so as to prevent dissipation of the fiber-like conductive material, such as CNT, which constitutes the electron source.

FIG. 3(c) shows an example of the small electron source 2an, wherein the layers 10 containing boron (B) are formed on both the front and back surfaces of the small electron source 2an. Besides the effect of preventing the dissipation of the conductive material, which effect is obtained in the same manner as the above-mentioned constitutional example shown in FIG. 3(a) and FIG. 3(b), this constitutional example also has an advantageous effect in that it is possible to facilitate the formation of small electron sources 2an of high accuracy by carrying out the fabrication method to be described later. FIG. 3(d) to FIG. 3(g) show examples of the electron source 2a in which the layer 10 containing boron (B) is preliminarily formed on the front surface of the cathode line 2 and the small electron source 2an is formed on the layer 10. Here, the layer 10 containing boron (B) can be formed by mixing boron (B) into a paste at the time of forming the cathode line 2 per se. FIG. 3(e) shows an example of the small electron source 2an, wherein the layer 10 containing boron (B) is formed on the front surface and the back surface of the small electron source 2an, which also has an advantageous effect substantially equal to the advantageous effect obtained by the example of the small electron source 2an shown in FIG. 3(c). Further, the example of the small electron source 2an shown in FIG. 3(f) can also provide the advantage that the conductive material dissipation prevention effect can be further enhanced by encasing the conductive material with the layer 10.

In the same manner, according to the example of the small electron source 2an shown in FIG. 3(g), by encasing the conductive material with the layer 10 containing boron (B) and by mixing the conductive material and boron (B), it is possible to achieve the advantage that the conductive material dissipation prevention effect can be further enhanced. Due to the above-mentioned constitutions shown in FIG. 3(a) to FIG. 3(g), it is possible to prevent the dissipation of the fiber-like conductive material, such as CNT, which constitutes the electron source; and, hence, it is possible to obtain a sufficient electron emission quantity and the uniform emission of electrons. Furthermore, the deterioration of the electron discharge property can be prevented.

Figure 4:
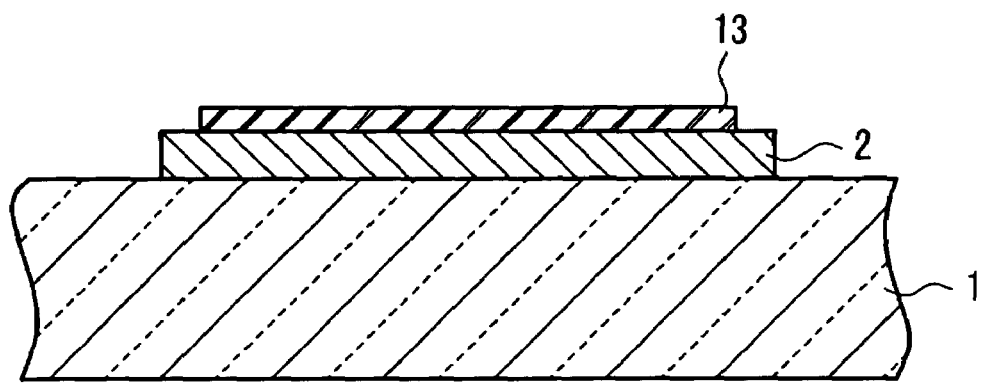
FIG. 4 is a cross-sectional view of a part of a display device, illustrating a step in the method of a fabrication of the field emission type display device according to the present invention.

FIG. 4 to FIG. 7 are cross-sectional views showing part of the display device during sequential steps in the method of fabrication of the field emission type display device according to the present invention. First of all, as shown in FIG. 4, the cathode lines 2 are formed on the back substrate 1, which consists of a glass plate, by applying a silver (Ag) paste to the back substrate 1 and by baking the silver paste. Thereafter, a paste for electron sources made of a material containing CNT and conductive fillers, such as silver (Ag) or the like, is printed on the cathode lines 2 and is heated at a temperature in a range of 300 to 350° C. so as to decompose the organic binders in the paste for electron sources, thus forming an electron source layer 13.

Although the above-mentioned heating is not indispensable, to obtain a remarkable boron (B) adhering effect in the succeeding step, it is desirable to decompose and eliminate the organic binders which cover the surface of the cathode lines 2. Further, in this step, it is also possible to form the electron source layer 13 by printing a paste which contains only CNT.

Figure 5:
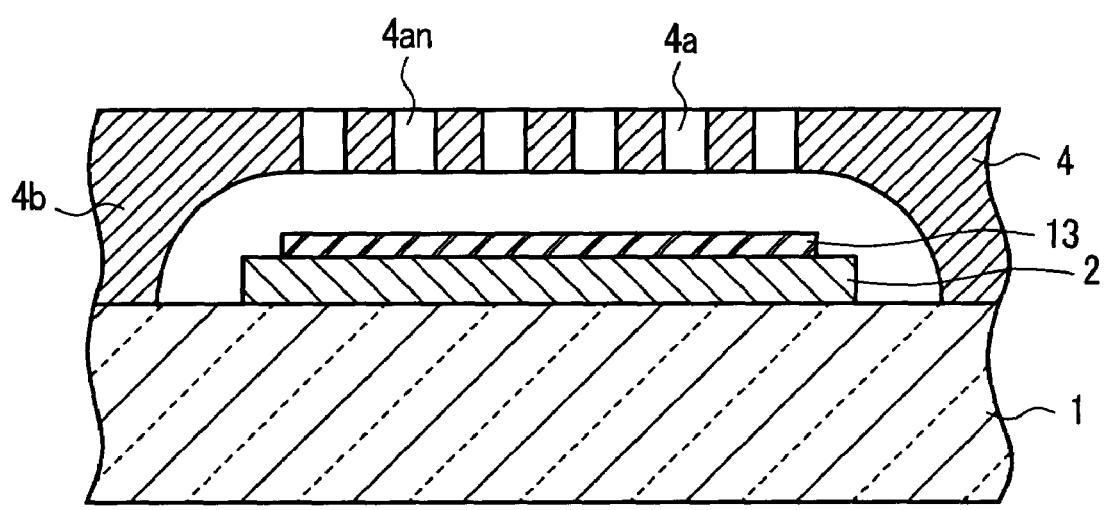
FIG. 5 is a cross-sectional view of a part of a display device, illustrating a further step in the method of a fabrication of the field emission type display device according to the present invention.

Next, as shown in FIG. 5, the control electrodes 4 are set over the back substrate 1 to serve as masks. That is, the control electrodes 4 are set such that a plurality of small apertures 4an that are formed in each control electrode 4 face the electron source layer 13, and the distal ends of the projecting portions 4b are brought into contact with the surface of the back substrate 1. Thereafter, both the control electrodes 4 and the back substrate 1 are temporarily fixed to each other.

In this step, after positioning both the control electrodes 4 and the back substrate 1, both may be fixed to each other by heating them at a temperature in a range of approximately 400° C. to 450° C. Although the oxidation and dissipation of CNT will start due to the coexistence with metal at the above-mentioned heating temperature of equal to or more than 450° C., since the fixing time using frit glass is completed within approximately 10 minutes, the deterioration of the electron emission characteristic involves only a trace amount, which can be substantially ignored. To obviate the deterioration of the electron emission characteristic such that no practical problem arises, it is possible to perform fixing of both of the control electrodes 4 and the back substrate 1 in a non-oxidizing atmosphere, such as a nitrogen atmosphere. Further, in this step, it is also possible to use other masks in place of the control electrodes 4. It is also effective to use exclusive-use masks by taking mass productivity into consideration.

Figure 6:
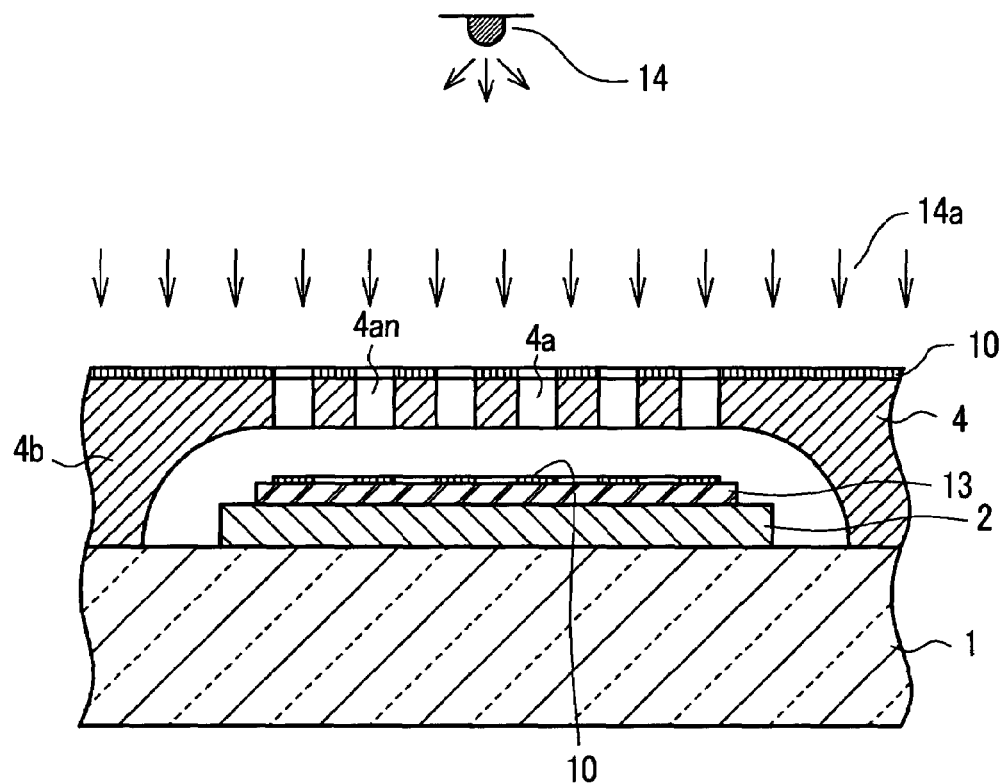
FIG. 6 is a cross-sectional view of a part of a display device, illustrating a further step in the method of a fabrication of the field emission type display device according to the present invention.

On the other hand, the use of the control electrodes 4, which are incorporated into the product as mentioned previously, has the characteristic that the alignment of the small apertures and the small electron sources corresponding to the small apertures, that is, the coaxial property or the alignment of the areas, the shapes of the small apertures and the small electron sources corresponding to the small apertures, is facilitated. Subsequently, as shown in FIG. 6, boron (B) is scattered from a vapor deposition source 14. The scattered boron (B) material 14a passes through the above-mentioned face-substrate-5-side surface of the control electrode 4 and the small apertures 4an and is adhered to respective surface portions of the electron source layer 13, which will become the small electron sources 2an, and forms the layer 10 containing boron on these surfaces. The method for scattering boron (B) may be a conventionally known method. Further, it is not always necessary that boron is adhered in a single form, and it may be adhered in various forms including boron oxide and boric acid. Further, it is unnecessary to remove impurities contained at the time of adhering, provided that the impurities do not remarkably impede the electron emission per se from the CNT.

Figure 7:
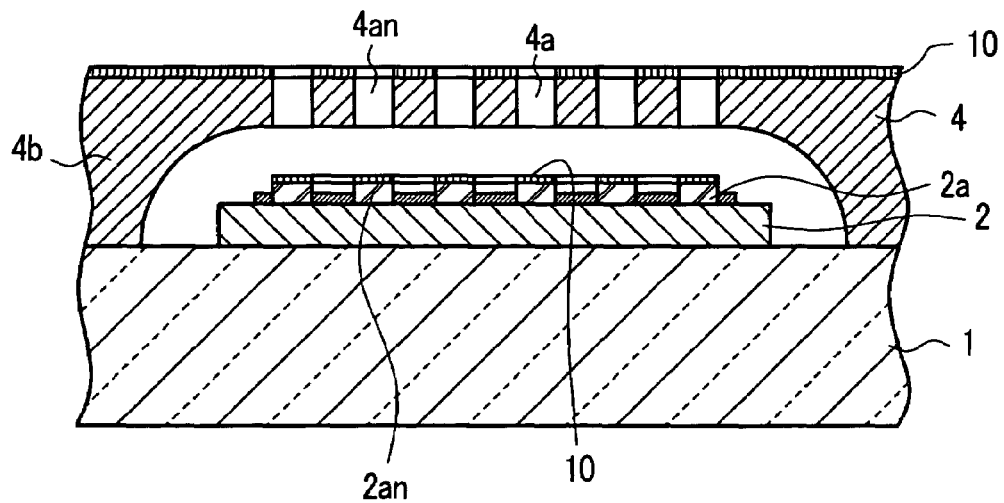
FIG. 7 is a cross-sectional view of a part of a display device, illustrating a further step in the method of a fabrication of the field emission type display device according to the present invention.

Then, the above-mentioned structure is heated at a temperature of 450° C. for 30 to 60 minutes. Due to this heat treatment, the CNT in the remaining portions of the electron source layer 13, excluding the small-electron-source-2*an* portions which are covered with the layer 10 containing boron, are removed. That is, the small-electron-source-2*an* portions of the electron source layer 13, which are covered with the layer 10 containing boron, suppress the oxidation of the CNT as the adhered boron per se is oxidized to form the boron oxide and form protective layers for the CNT; and, hence, the CNT remains. However, with respect to the peripheries of the electron source layer 13 which are not covered with the boron layer 10, the CNT in the whole layer or the CNT excluding the conductive fillers is dissipated by heating, and, hence, the columnar small electron sources 2*an* are formed, as shown in FIG. 7. Further, boron adhered to the control electrodes 4 is fixedly adhered to such portions. Here, FIG. 7 shows a constitution in which the conductive fillers remain in the peripheries of the small electron sources 2*an*.

Here, the heating temperature may be determined by taking the composition of the electron source layer 13 and the like into consideration. However, since no restriction is imposed on the heating temperature during the fabrication steps even when the heating temperature is 450° C. or more, it is possible to sufficiently maintain the desired electron emission efficiency. Further, the CNT which is protected by boron at once exhibits the protection effect even with respect to the additional heating under atmosphere conditions, which follows thereafter. Even when the heating is performed under atmosphere conditions again at a temperature of 450° C. or more, the CNT exists in a fiber form. Further, the deterioration of the electron emission characteristic can be obviated. This implies that the CNT exhibits a resistance not only in the baking process of the printing paste, but also in the succeeding heating process of the manufacturing steps; and, hence, a yield rate in the fabrication of panels and the reliability of products can be remarkably enhanced, and the lifetime of the display device can be prolonged.

With use of the above-mentioned fabrication method, it is possible to selectively adhere the layer 10 containing boron to the control electrodes 4 at desired positions over a desired area by way of the masks. Further, by combining the CNT oxidation suppression action which boron has with the above selective adhesion of layer 10, due to their coupled effect, it is possible to attain self-alignment of the small apertures 4*an* and the small electron sources 2*a*, and, at the same time, it is possible to adopt the desired heating temperature in the fabrication steps, whereby it is possible to obtain excellent advantageous effects, such as the acquisition of accurate alignment of the small apertures 4*an* and the small electron sources 2*an*, the acquisition of a high electron emission efficiency, and a reduction of the inflow of undesired electrons into the control electrodes. Further, with the use of the control electrodes 4 as masks, not to mention the acquisition of accurate alignment, the control of areas of the small electrons sources 2*an* is further facilitated.

Figure 8:
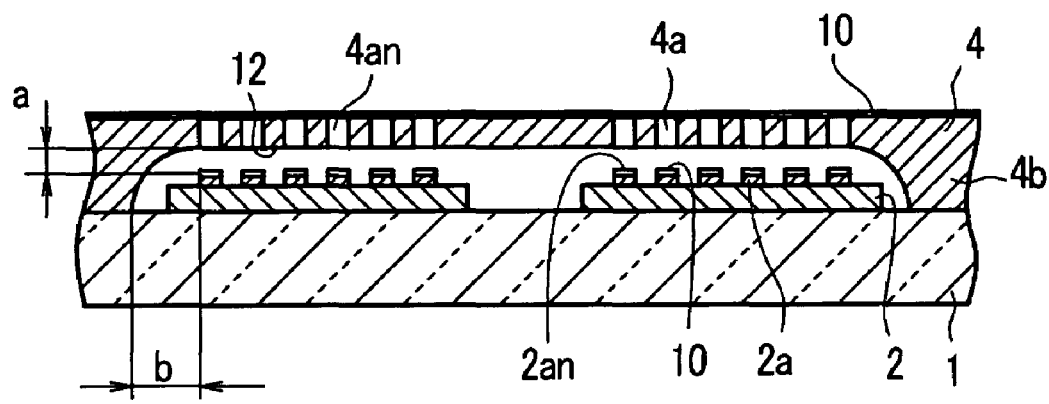
FIG. 8 is a cross-sectional view of another embodiment of the field emission type display device according to the present invention.

FIG. 8 is a diagrammatic cross-sectional view of a portion of another embodiment of the field emission type display device according to the present invention and is similar to the embodiment shown in FIG. 2. The embodiment shown in FIG. 8 is characterized by a reduction in the number of projecting portions 4*b* compared to the constitution shown in FIG. 2. In this embodiment, the control electrode 4 is formed to extend over every two cathode lines 2. Also in this constitution, in the same manner as the constitution shown in FIG. 2, the distance "a" between the top faces 11 of the small electron sources 2*an* and the bottom faces 12 of the small apertures 4*an* is defined by the projecting portions 4*b* of the control electrodes 4 and is also set to approximately 25 μm in this embodiment in the same manner as described above. Further, the distance "b" between the projecting portions 4*b* and the small electron source 2*an* closest to the projecting portions 4*b* is set to a size which maintains the relationship in which the distance "b" is twice or more greater than the distance "a", that is, b≧2a. By maintaining this relationship between the distance "b" and the distance "a", the flow of an undesired current into the control electrodes 4 becomes difficult, and, hence, the display efficiency is enhanced. Further, although the projecting portions 4*b* are formed such that the control electrode 4 extends over every two cathode lines 2 in the example shown in FIG. 8, by forming the projecting portions 4*b* such that the control electrode 4 extends over three cathode lines of three primary colors of red (R), green (G) and blue (B) for display, it is possible to achieve a reduction of the color difference.

Figure 9:
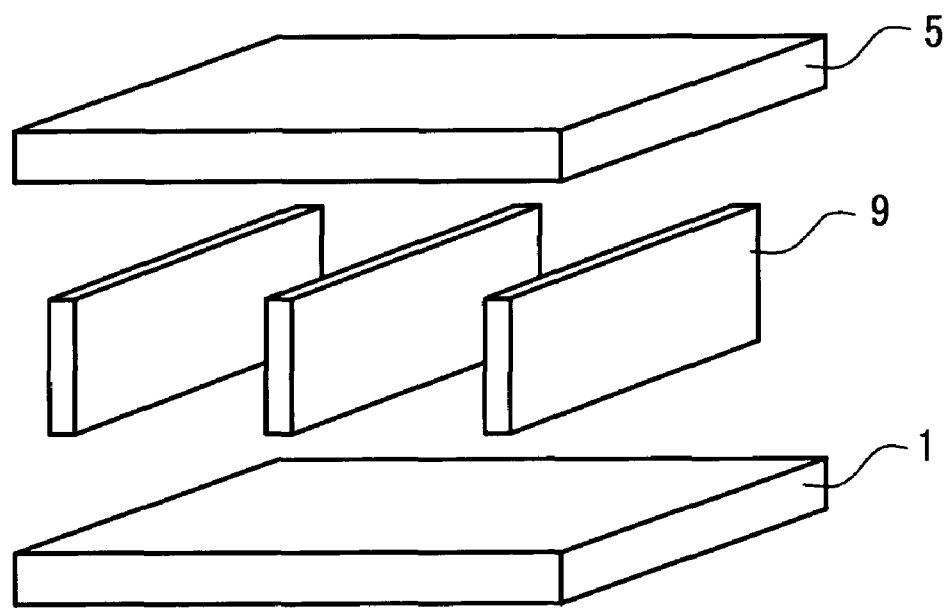
FIG. 9 is a diagrammatic perspective view showing one example of the holding structure for holding a given distance between a back substrate and a face substrate of the field emission type display device according to the present invention.

FIG. 9 is a diagrammatic perspective view showing one example of the holding structure for maintaining a given distance between the back substrate 1 that is arranged at the electron source side of the display device of the present invention and the face substrate 5 that is arranged at the fluorescent face side of the display device of the present invention. Between the electron-source-side back substrate 1 on which the above-mentioned cathode lines 2, electron sources 2*a* and control electrodes 4 are formed and the fluorescent-face-side face substrate 5, partition walls (or spacers) 9 are interposed, and the peripheries of both substrates 1, 5 are sealed by a frame glass (not shown in the drawing) and glass frit (not shown in the drawing). This sealing is performed in the atmosphere at a temperature of 430° C. Thereafter, the space defined between both substrates 1, 5 is evacuated and is sealed in vacuum while heating the holding structure at a temperature of 350° C.

Figure 10:
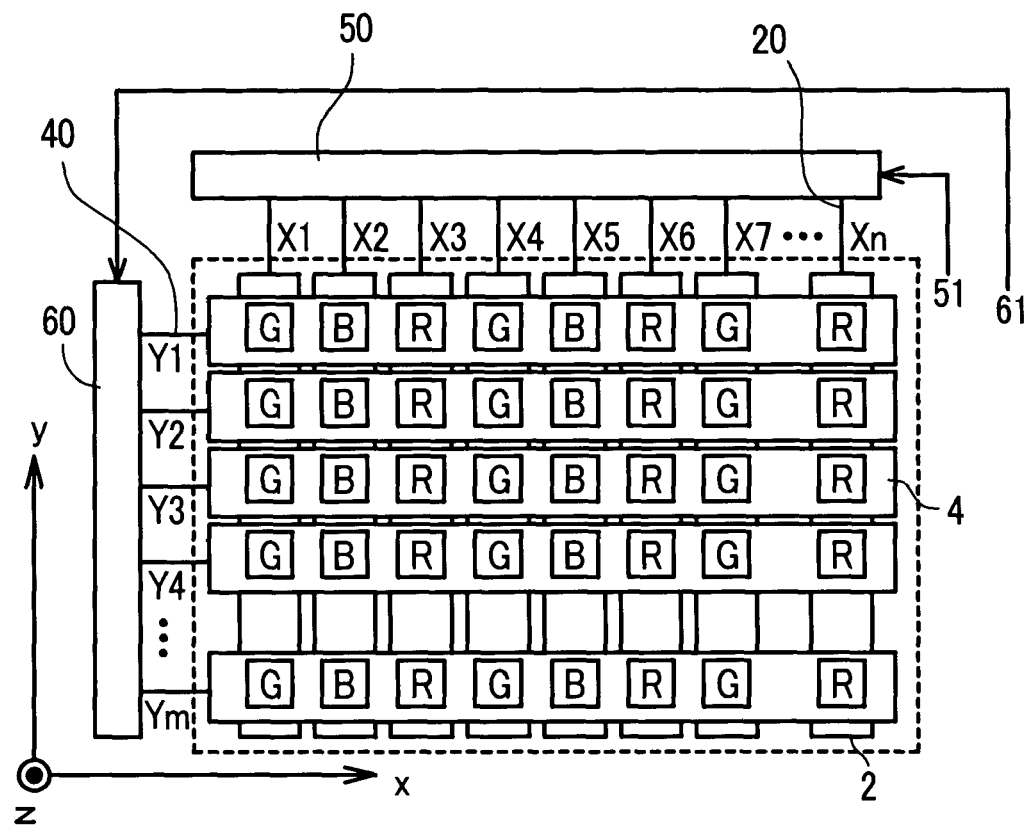
FIG. 10 is an equivalent circuit diagram showing one example of a method of driving a display device according to the present invention.
Figure 11:
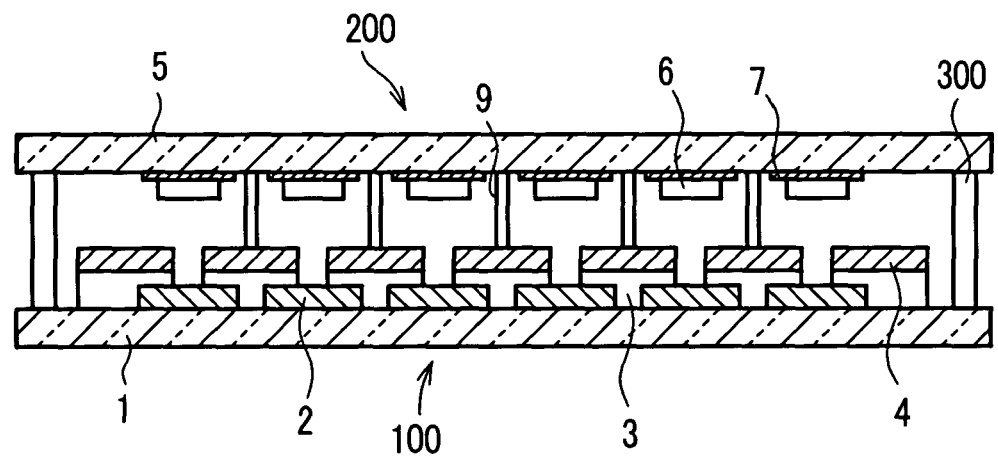
FIG. 11 is a cross-sectional view showing an example of a conventional field emission type display device.
Figure 12:
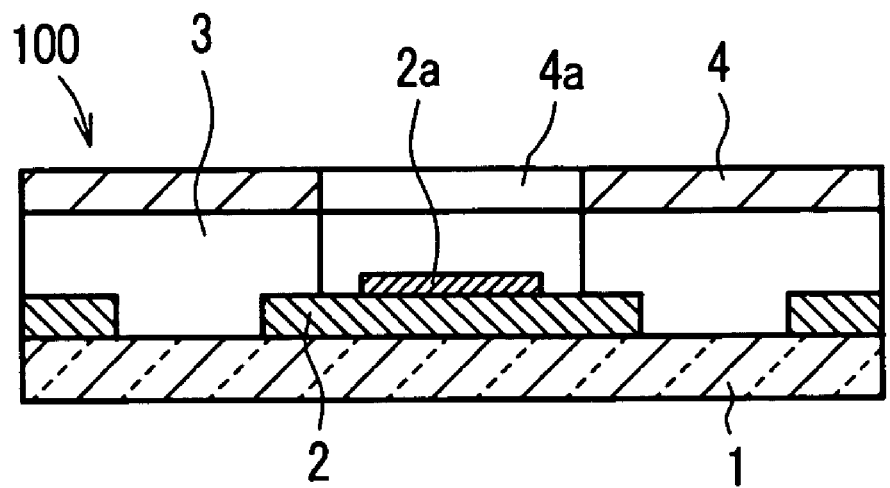
FIG. 12(*a*) is a side sectional view and FIG. 12(*b*) is a top plan view of an example of an electron emitting source and a control electrode for controlling the electron emission quantity in one pixel of a conventional field emission type display device.
Figure 12:
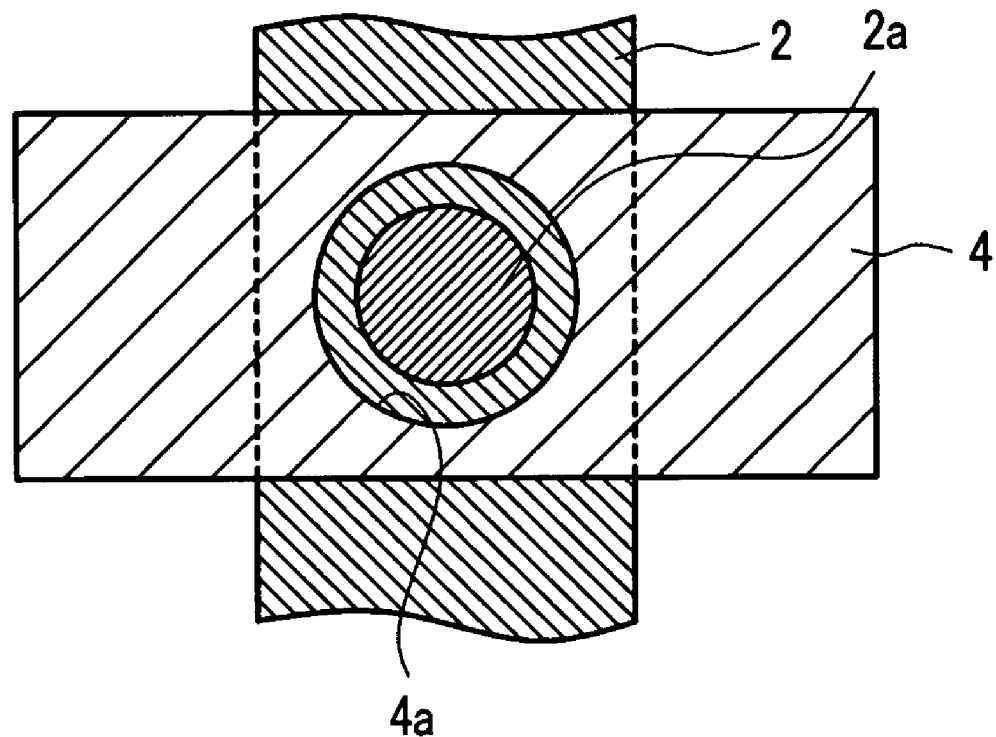
Figure 13:
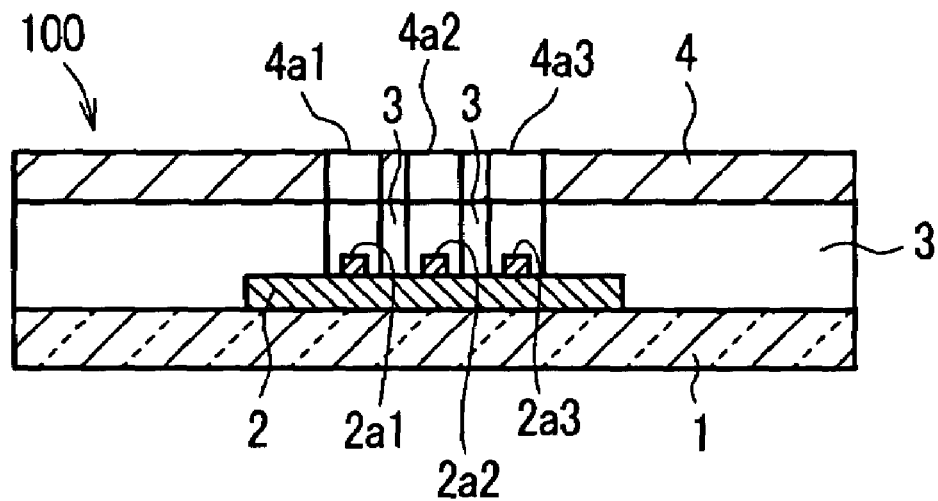
FIG. 13(*a*) is a side sectional view and FIG. 13(*b*) is a top plan view in which a plurality of electron sources of the conventional field emission type display device are formed per one pixel.
Figure 13:
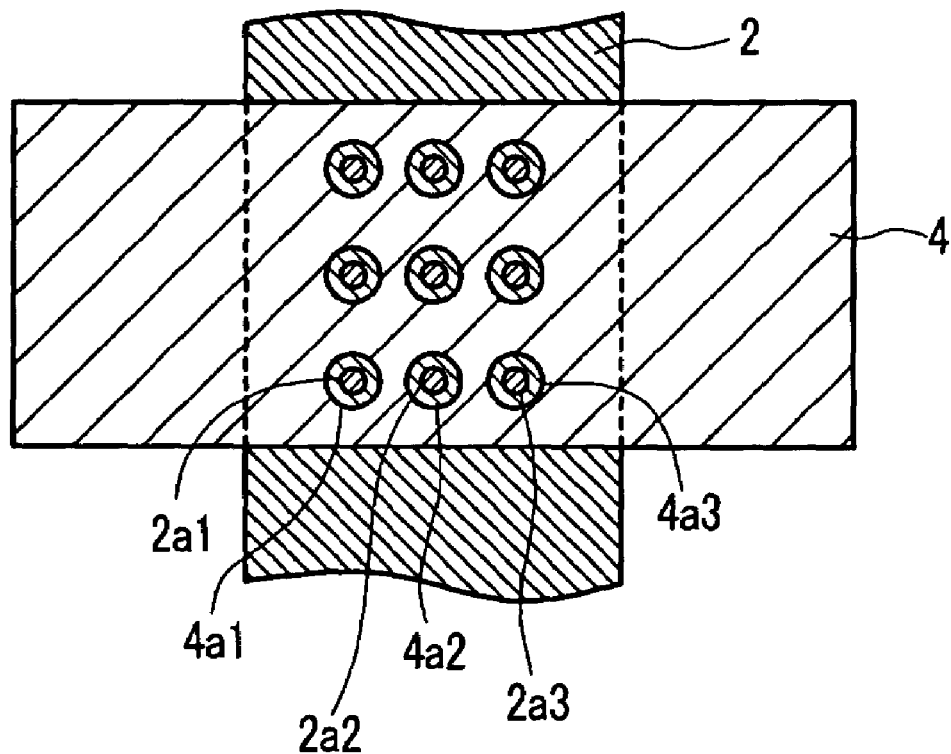
Figure 14:
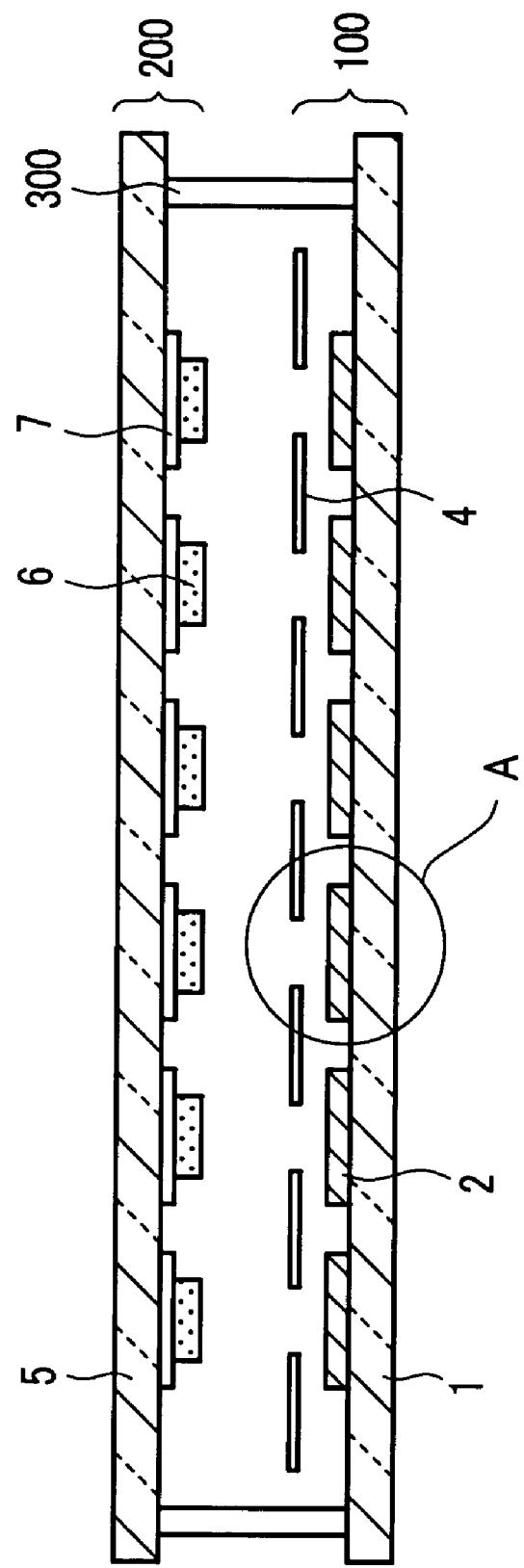
FIG. 14 is a diagrammatic cross-sectional view showing another example of a conventional field emission type display device.
Figure 15:
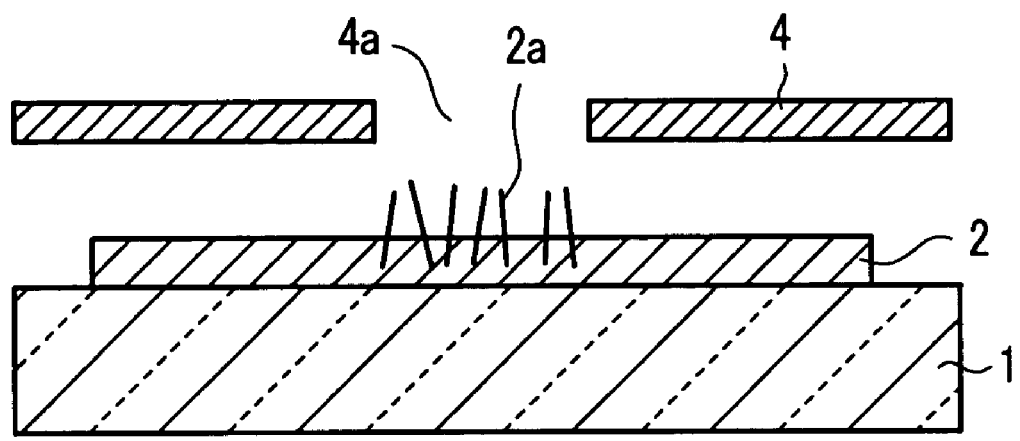
FIG. 15 is an enlarged cross-sectional view showing a portion within the circle A in FIG. 14.

FIG. 10 is an equivalent circuit diagram showing one example of a method of driving the display device according to the present invention. In this display device, n cathode lines (electron source lines) 2, which extend in the y direction, are juxtaposed in the x direction. Further, m control electrodes (metal grids) 4, which extend in the x direction, are juxtaposed in the y direction, thus constituting a matrix of m rows and n columns together with the cathode lines 2. On side and top peripheral areas of the electron-source-side back substrate which constitutes the display device, a scanning circuit 60 and a video signal circuit 50 are arranged. Respective control electrodes 4 are connected with the scanning circuit 60 at control electrode terminals 40 (Y1, Y2, . . . Ym). Respective cathode lines 2 are connected with the video signal circuit 50 at cathode terminals 20 (X1, X2, . . . Xn).

For every pixel that is arranged at each one of the crossing portions of the cathode lines 2 and the control electrodes 4 which are arranged in a matrix array, there is an electron source which is formed of a mass of a plurality of small electron sources containing boron, as described with reference to the above-mentioned embodiment. In the drawing, R, G, B respectively indicate monochromatic pixels of red (R), green (G) and blue (B), each of which constitutes one pixel of each color. These respective monochromatic pixels emit light corresponding to the respective colors from the fluorescent materials. To the scanning circuit 60 and the video signal circuit 50, various signals for display are supplied from a host computer (not shown in the drawing). Synchronizing signals 61 are also inputted to the scanning circuit 60. The scanning circuit 60 selects the row of the matrix of the control electrodes 4 through the control electrode terminals 40 and applies scanning signal voltages to the control electrodes 4.

On the other hand, video signals 51 are inputted to the video signal circuit 50. The video signal circuit 50 is connected to the cathode lines 2 through the cathode terminals 20 (X1, X2, . . . Xn), and it selects the column of the matrix and applies voltages corresponding to the video signals 51 to the selected cathode lines 2. Accordingly, given pixels which are sequentially selected by the control electrodes 4 and the cathode lines 2 emit light in given colors, thus displaying two-dimensional images. With the use of a display device which uses CNT according to this constitutional embodiment as the electron source, it is possible to realize a bright display device, which is operated with a relatively low voltage at high efficiency, and in which display irregularities can be suppressed.

Here, although the embodiment is directed to the use of CNT (multi-wall CNT and single-wall CNT, carbon nanotubes in a broad meaning) as the electron emission material in accordance with the present invention, it is possible to use any material that can obtain a similar advantageous effect as the electron irradiation material provided that the material is an inorganic carbon material. As an inorganic carbon material other than CNT, for example, diamond, diamond-like carbon, graphite, and amorphous carbon can be used. Alternatively, a mixture of these materials also can be used as the electron irradiation material. Further, it is needless to say that the present invention is not limited to the constitutions of the above-mentioned embodiments and that various modifications can be made within the scope of the technical concept of the present invention.

As has been described heretofore, according to the typical embodiment of the present invention, in the display device, one pixel is constituted by combining a plurality of small apertures and a plurality of small electron sources. Due to such a constitution, small electron sources having a desired area can be formed in the given regions; and, hence, the inflow of electrons to the control electrodes can be reduced, and, at the same time, an alignment of the small electron sources and the small apertures can be easily achieved. Further, the present invention can also exhibit other advantageous effects, such as the acquisition of a high-performance electron emission characteristic, and the prevention of the deterioration of the characteristics of the electron sources, whereby a display device of high definition, high performance and high reliability can be realized.

Further, the heat resistance of the carbon nanotubes can be enhanced; and, hence, it is possible to elevate the heating temperature in the electron source baking step and the substrate sealing step in the fabrication process to a given high temperature, whereby it is possible to realize a display device having a long lifetime, which exhibits a high-performance electron emission characteristic and in which deterioration of the characteristics of the electron sources can be prevented.

Further, it is possible to use a general-use heating furnace (or a baking furnace) in the heating step of the fabrication process, and this contributes to a reduction of the fabrication cost. Further, by also adopting heating or baking in a non-oxidizing atmosphere in combination, the uniformity of the electron emission can be further enhanced, whereby it is possible to provide a display device of high quality.

What is claimed is:

1. A display device comprising:
    a back panel which includes a plurality of cathode lines, a plurality of electron sources which are arranged on the plurality of cathode lines, control electrodes which are arranged to face the cathode lines in an opposed manner and control an emission quantity of electrons from the electron sources, and a back substrate which holds the cathode lines; and
    a face panel which includes anodes and fluorescent materials, wherein
    the control electrodes include a plurality of small apertures which allow electrons emitted from the electron sources to pass therethrough to the face panel side at respective regions which respectively face the each electron source, and
    each respective electron source is divided into a plurality of small electron sources corresponding to the plurality of respective small apertures provided in each region, and the small electron sources and the control electrodes contain boron.

2. A display device according to claim 1, wherein the control electrodes are made of a metal material.

* * * * *